J. A. Bunce.
Lathe Chuck.
N° 53,405.            Patented Mar. 27, 1866.
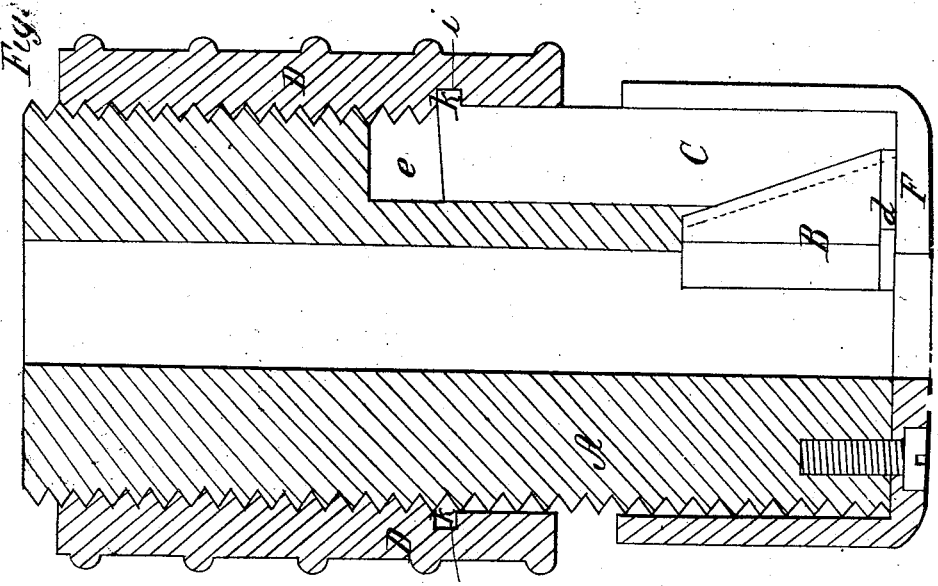
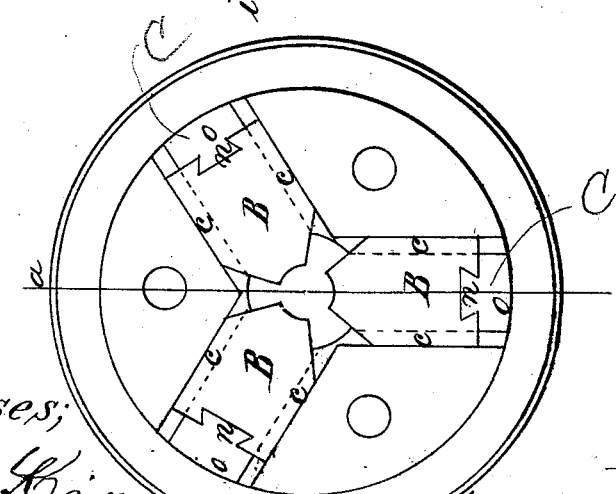
Witnesses;
Seth B. King
Jerry W. Blys
Inventor;
James A. Bunce

UNITED STATES PATENT OFFICE.

JAMES A. BUNCE, OF EAST BERLIN, CONNECTICUT.

IMPROVEMENT IN LATHE-CHUCKS.

Specification forming part of Letters Patent No. 53,405, dated March 27, 1866.

*To all whom it may concern:*

Be it known that I, JAMES A. BUNCE, of East Berlin, county of Hartford, and State of Connecticut, have invented certain new and useful Improvements in Self-Centering Chucks; and I do hereby declare that the same is described and represented in the following specification and drawings; and to enable others skilled in the art to make and use the same I will proceed to describe by referring to the drawings, in which the same letters indicate like parts in each of the figures.

The nature of this improvement will be understood from the specification and drawings.

The object desired to be attained thereby is to produce a chuck which shall possess all the requisite qualities of those now in use, and at the same time be simpler and cheaper of manufacture.

In the accompanying drawings, Figure 1 is a sectional view through the center of the chuck, as shown by the line $a$. Fig. 2 is an end view, showing the sliding dovetail wedge-shaped bar, which unites with a corresponding-shaped joint and jaw for moving in and out the jaws.

A is the stock, made of any suitable material and having slits cut or formed in the outer end, in which to allow the jaws B to work closely and freely back and forth in a right-angle line with the stock, and having a rabbet-recess, $c$, on each side of the face end of said stock to receive the flange edge $d$, formed on each side of the end of the jaws. It (the stock) is also provided with grooves or recess $e$, in which to allow the sliding dovetail wedge-shaped bar C to work closely and freely to operate the jaws in and out, as desirable. The outer surface of this stock has a screw-thread cut thereon.

D is a sheath having a screw-thread cut on the inside, so as to fit closely and work freely on the stock A. The inside of this sheath, and back a proper distance from the front end thereof, is turned out smoothly to the bottom of the thread, and has a groove or recess, $i$, formed therein to receive the lip or flange $k$, formed on the back end of the sliding bar C. After the stock A is prepared the sheath is screwed thereon until the groove $i$ in the sheath D is nearly down to the lower end of the opening to receive and hold the jaws B, when the lip $k$ of the sliding bar C is inserted into said groove $i$, and the sheath turned onto the stock, drawing therewith the bars C into the grooves or recess $e$, until the outer ends, (wedge and dovetail ends,) $n$ $o$, are about even with the face end of the stock.

When the jaws B are respectively inserted to their places upon the dovetails $n$, then the cap F, which is made so as to just fit onto said stock over the threads and the outer edges of the sliding bars, C, against which the outer edges of the said sliding bars work back and forth as the sheath D is turned to move the jaws B in or out in said cap. The face of the jaws work back and forth against the inside face of the cap.

Thus all the parts are or may be made in duplicate form, so that any one piece will fit any other part or chuck, and are put together in working order and held in place by screws passing through the face of the cap into the end of the stock. This chuck is designed to be secured upon a spindle in the usual way.

I believe I have thus shown the nature, construction, and operation of this improvement, so as to enable others skilled to make and use the same.

What I claim, therefore, and desire to secure by Letters Patent, is—

The combination of the sliding bars C with the jaws B, sheath D, and stock, A, substantially in the manner as and for the purpose described.

JAMES A. BUNCE. [L. S.]

Witnesses:
SETH B. KING,
JEREMY W. BLISS.